US006892215B2

(12) United States Patent
Freking et al.

(10) Patent No.: US 6,892,215 B2
(45) Date of Patent: May 10, 2005

(54) FAST PARALLEL CASCADED ARRAY MODULAR MULTIPLIER

(75) Inventors: William L. Freking, 2258 Timberlea Dr., Woodbury, MA (US) 55125-3001; Keshab K. P Parhi, Mission Viejo, CA (US)

(73) Assignee: William L. Freking, Lexington, MA (US)

( * ) Notice: Subject to any disclaimer, the term of this patent is extended or adjusted under 35 U.S.C. 154(b) by 488 days.

(21) Appl. No.: 10/192,911

(22) Filed: Jul. 10, 2002

(65) Prior Publication Data

US 2004/0010534 A1 Jan. 15, 2004

(51) Int. Cl.⁷ .............................................. G06F 7/72
(52) U.S. Cl. ...................................................... 708/491
(58) Field of Search ................................ 708/491–492

(56) References Cited

U.S. PATENT DOCUMENTS

| | | | | |
|---|---|---|---|---|
| 5,101,431 A | * | 3/1992 | Even ............................ | 380/30 |
| 6,151,393 A | * | 11/2000 | Jeong .......................... | 380/265 |
| 6,763,365 B2 | * | 7/2004 | Chen et al. .................. | 708/491 |
| 6,804,696 B2 | * | 10/2004 | Chen et al. .................. | 708/491 |
| 2004/0010530 A1 | * | 1/2004 | Freking et al. ............. | 708/491 |

* cited by examiner

Primary Examiner—D. H. Malzahn

(57) ABSTRACT

A fast, parallel modular multiplier is presented which is scalable according to available hardware resources. Linear throughput increases with respect to consumed resources is achieved. Multiple independent data streams may be processed simultaneously, and optimal clock rates are attained by virtue of limited fan-out of all signal paths and nearest neighbor interconnections. Integrated circuit implementation is benefited by the potential for signal sharing among input and output busses and a common control interface for all independent data streams.

1 Claim, 1 Drawing Sheet

FAST PARALLEL CASCADED ARRAY MODULAR MULTIPLIER

CROSS-REFERENCE TO RELATED APPLICATIONS

Not applicable.

BACKGROUND OF THE INVENTION

1. Field of the Invention

The present invention relates to the processing of digital signals to render modular multiplication.

2. Description of Related Art

Modular multiplication, which is the computation of A·B modulo M where A, B, and M are integer values, is a fundamental mathematical operation in applications based on number-theoretic arithmetic. A central application area is cryptography, where techniques such as the popular RSA and DSS methods utilize modular multiplication as the elemental computation. Since large word lengths on the order of thousands of bits are typically processed, hardware approaches to modular multiplication are typically very slow. Existing art attempts to address this deficiency through a handful of approaches.

Linear systolic array approaches dominate the art, with the article C. Walter, "Systolic modular multiplication," IEEE Transactions on Computers, v. 42, no. 3, pp. 376–378, 1993, being representative. In such an approach, a linear array of processing elements is connected so that all signal paths are formed between adjoining elements only. Thus, signal path lengths are minimized. Accordingly, all signal paths only connect two adjoining elements, guaranteeing unit fan out. The forgoing properties of systolic arrays ensure that the clock rate is determined solely by the processing element delay. However, efforts to scale the performance beyond the level offered by a single linear array have encountered very limited success. Cell optimization is the commonly applied technique to gain performance. However, performance scales only logarithmically with respect to consumed integrated circuit area.

Another method which attempts to provide a performance-area tradeoff is the digit-serial array. In the paper, J. Guo and C. Wang, "A novel digit-serial systolic array for modular multiplication," in Proc. of the 1998 IEEE International Symposium on Circuits and Systems, v. 2, pp. 177–180, 1998, a digit-serial modular multiplier methodology was presented. However, the arrays were not pipelined, and thus the clock period of the digit-serial cells grows proportionally with digit size. Therefore, performance scaling occurs in a sub-linear fashion for small digit sizes and quickly saturates to yield negligible performance gains for large digit sizes.

A non-systolic array was presented in the article H. Orup, "Simplifying quotient digit determination in high-radix modular multiplication," in Proc. of the 12th Symposium on Computer Arithmetic, pp. 193–199, 1995. A roughly linear performance-area tradeoff was achieved through retiming of the modular correction loop within the modular multiplication algorithm. However, the clock rate is severely limited by the required full-word-length signal broadcasts of the modular correction selection bit. Thus, the fan out of the aforementioned signal is the complete word length. Implementational efforts to increase the signal drive through transistor sizing destroys the linear performance-area trade off and only provide minor mitigation of the slow-clock-rate obstacle plaguing this methodology.

SUMMARY OF THE INVENTION

The present invention describes a method for parallel modular multiplication capable of processing multiple independent data streams simultaneously.

An implementation realizing this method consists of a cascade of full-word-length linear arrays of processing elements which each accept and generate bit-level data. Each processing element performs bit-wise partial product formation, modular correction formation, and summation of the generated partial product and modular correction bits with the right-single-bit-shifted result of the previous algorithmic iteration. The number of rows of the array cascade is determined in accordance with the available integrated circuit implementation area and the desired throughput performance, which scales linearly with row count. Data propagates in a feed-forward manner from row to row upon completion of the segment of iterations assigned to each row.

The data stream capacity and operational throughput are directly scalable with the available integrated circuit implementation area. This performance scalability is accomplished while maintaining a systolic paradigm, such that all interconnection paths are locally connected to neighboring processing elements and entail minimal fan out. Thus, the achievable clock rate is maximized and is dictated by the processing element delay rather than by long interconnect paths or loading due to multiple-gate fan out. Moreover, in contrast to isolated parallel modular multiplication arrays, the unified array structure of the present invention incorporates single input and output data buses, thereby reducing global integrated circuit wiring overhead. Additionally, the unified array permits a single controller to be utilized when the modular multiplier is utilized as a component in a higher-level functional unit such as a modular exponentiator.

OBJECTS AND ADVANTAGES OF THE INVENTION

The primary object of this invention is fast parallel processing of modular multiplication.

It is an advantage of this invention that multiple independent data streams may be simultaneously processed. The number of data streams is arbitrary, limited only by implementation area.

It is a primary advantage of this method that throughput performance scales linearly with the area of the integrated circuit implementation while maintaining the optimal systolic clock rate. The latter is attained through guaranteeing properties of purely nearest neighbor interconnections between processing elements and unit signal fan out.

It is an advantage of this invention that input and output data share signal lines such that the number of internal signal buses in an integrated circuit implementation are reduced.

It is an advantage of this invention that a unified control unit may be utilized when the modular multiplier unit is used in a modular exponentiator.

DETAILED DESCRIPTION OF PREFERRED EMBODIMENTS

Figure 1:
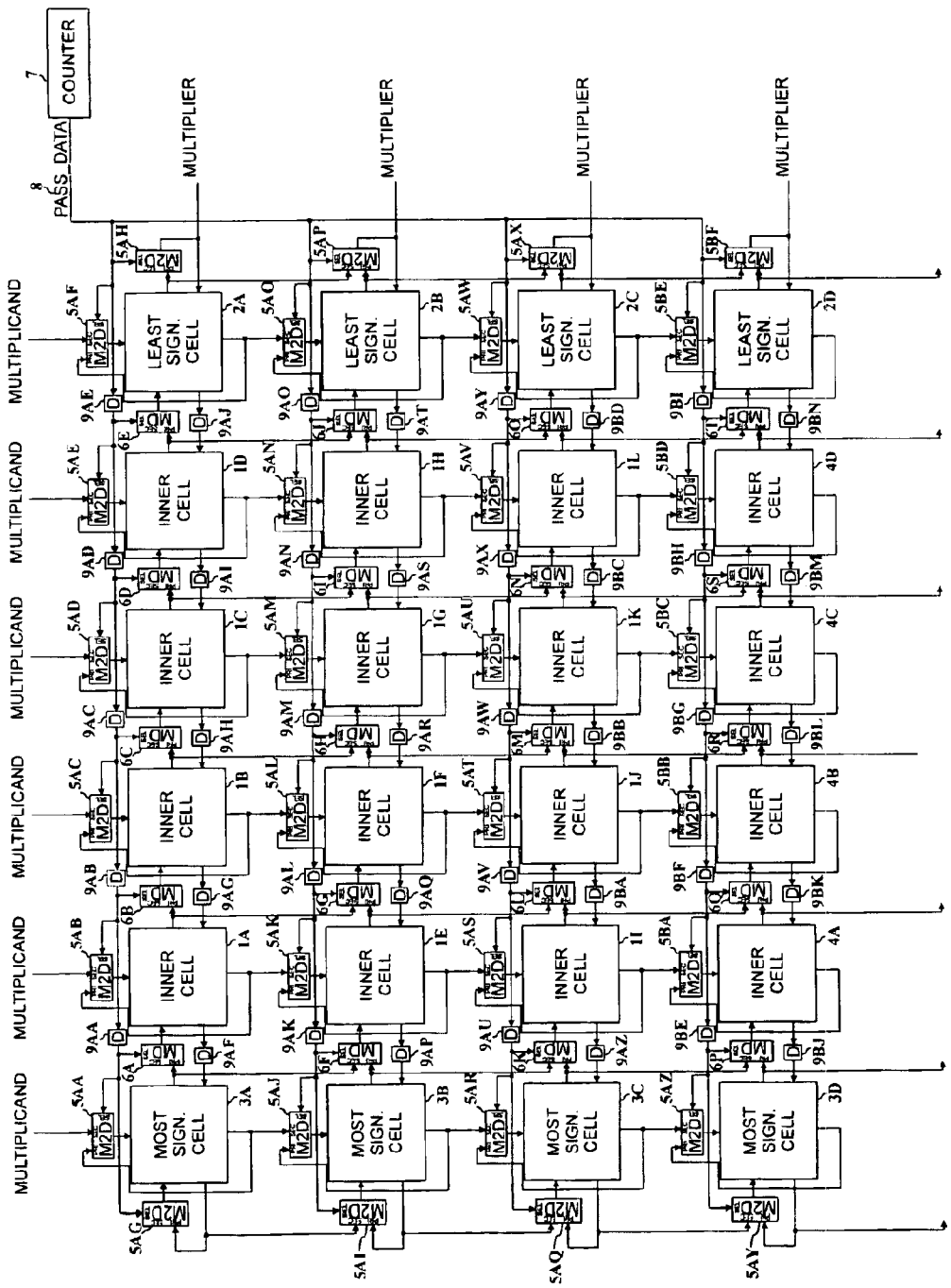
FIG. 1 illustrates the modular multiplier with its connections.

The preferred embodiment is delineated in FIG. 1. It consists of a cascade of K linear systolic arrays of bit-wise processing cells, where K is chosen according to the amount of integrated circuit area available for the implementation. The value of K directly relates to the amount of parallelism implemented in the system. Each array is composed of N+1 cells, where N represents the word length of the modulus value in bits.

Each cell possesses a set of bit-wise inputs corresponding to the multiplicand, multiplier, modular correction, modular selection, partial sum, and two previous carry signals. Each cell also possesses a set of bit-wise outputs corresponding to the multiplicand, multiplier, modular correction, modular selection, generated partial sum, and two generated carry signals. Each inner cell 1 excluding the leftmost and rightmost peripheral cells in each array and all cells in the bottommost array, is interconnected within the structure in the following manner. The multiplicand output is delivered to input PRI of a multiplexed dual-delay element, whose output is connected to the multiplicand input of the cell under consideration. The multiplicand output also connects to the input SEC of a multiplexed dual-delay element whose output connects to the corresponding cell in the below-adjacent array. The multiplier output delayed by one cycle is connected to the left-adjacent cell's multiplier input. The modular correction output connects to input PRI of a multiplexed dual-delay element, whose output is connected to the modular correction input of the cell under consideration. The modular correction output also connects to the SEC input of a multiplexed dual-delay element, whose output connects to the modular correction input of the corresponding cell in the below-adjacent array. The modular selection output delayed by one cycle is connected to the left-adjacent cell's modular selection input. The generated partial sum output is connected to the PRI input of a multiplexed delay element whose output connects to the right-adjacent cell's partial sum input. The generated partial sum output also connects to the SEC input of a multiplexed delay element whose output connects to the partial sum input of the right-adjacent cell in the below-adjacent array. Finally, each of the two carry outputs delayed by one cycle is connected to the corresponding carry inputs of the left-adjacent cell.

Rightmost, least-significant cell 2 connections for the multiplicand and modular correction outputs are identical to the above description for the inner cells. However, the partial sum output connections differ. The partial sum output is connected to the PRI input of a multiplexed dual-delay element whose output is connected to the modular selection input. The partial sum output is also connected to the SEC input of a multiplexed dual-delay element associated with the below-adjacent array, whose output connects to the modular selection input of the corresponding cell. The multiplier input of a rightmost cell is supplied externally in the form of a serial, least-significant-bit first stream. Both carry inputs are connected to ground.

Leftmost, most-significant 3 cell connections for the multiplicand, modular correction, and partial sum outputs are identical to the inner cell description. The single carry output is connected to the PRI input of a multiplexed dual-delay element, whose output is connected to the partial sum input. The single carry output is also connected to the SEC input of a multiplexed dual-delay element, whose output is connected to the partial sum input of the corresponding cell in the below-adjacent array.

In the bottommost array 4, modular selection and multiplier outputs are connected identically to the aforementioned inner cell description. The modular correction output is connected to the PRI input of a multiplexed dual-delay element, whose output is connected to the modular correction input. The multiplicand output is connected to the PRI input of a multiplexed dual-delay element, whose output is connected to the multiplicand input. The partial sum output is connected to the PRI input of a multiplexed delay element, whose output is connected to the partial sum input of the right-adjacent cell.

Each cell performs a computation which, for the purposes of illustration, may be decomposed into the following sequence of bit-wise operations. The multiplicand input bit is ANDed with the multiplier input bit. Similarly, the modular correction input bit is ANDed with the modular selection input bit. The outputs of the two aforementioned computations are added with the partial sum input and the two carry inputs. The least significant bit of the latter sum is connected to the cell's partial sum output, while the two bits generated in the most significant position are connected to the two carry outputs. The multiplicand, modular correction, multiplier, and modular selection inputs are also passed to the multiplicand, modular correction, multiplier, and modular selection outputs, respectively. Within each rightmost cell, all aspects of the above description remain valid except that only a single bit in the most significant position is generated. Thus, each rightmost cell possesses a single carry output.

A delay element 9 receives a single input and delays the signal presented in the current clock cycle until the subsequent clock cycle, and presents the delayed single to the output.

The multiplexed dual-delay element 5 takes in two data inputs, labeled PRI and SEC. An additional input SEL is used to multiplex data at the PRI and SEC inputs to the input of a delay register. De-assertion of the SEL input selects the PRI input, while assertion selects the SEC input. The output of the delay register is connected to another delay register, whose output is identically the output of the multiplexed dual-delay element.

Similarly, the multiplexed delay element 6 takes in two data inputs, labeled PRI and SEC. An additional input SEL is used to multiplex data at the PRI and SEC inputs to the input of a delay register. De-assertion of the SEL input selects the PRI input, while assertion selects the SEC input. The output of the delay register constitutes the output of the multiplexed delay element.

A counter 7 asserts the signal PASS_DATA 8 for two clock cycles every $\lceil(N+2)/K\rceil$ clock cycles, where [ARGUMENT] denotes the next highest integer when the ARGUMENT is not an integer, otherwise [ARGUMENT]= ARGUMENT. The signal PASS_DATA is connected to the SEL input of each multiplexed delay element associated with each rightmost cell. De-assertion of the PASS_DATA signal selects the PRI input to the multiplexed delay element, whereas assertion selects the SEC input. Within each linear array, the PASS_DATA signal is also connected to a delay element associated with the rightmost cell, whose output connects to a corresponding delay element associated with the left-adjacent cell. Likewise, each inner cell accepts the PASS_DATA signal from the delay associated with the right-adjacent cell and outputs the signal to a delay element associated with the left-adjacent cell.

Initial data is supplied externally to the unit such that two new independent data sets commence processing every $\lceil(N+2)/K\rceil$ clock cycles, coincident with the assertion of the PASS_DATA signal. Multiplicand and modular correction data bits are entered into the topmost array in the following manner. The rightmost cell receives the modular correction, multiplicand and multiplier bits associated with the first of the two currently entering data streams upon the first clock cycle wherein PASS_DATA is asserted. Upon the next clock cycle, the modular correction multiplicand and multiplier bits associated with the second of two currently entering data streams are received. In subsequent cycles, the rightmost cell receives the next most significant multiplier bit associated with the first data stream if the clock cycle number is even, and with the second stream if the clock cycle number is odd. Multiplicand and modular correction bits are no longer externally entered into the array in the rightmost cell position until the next assertion of the PASS_DATA signal, at which point two new data streams are commenced. An arbitrary cell in column J of the topmost array externally receives the corresponding modular correction and multiplicand bits associated with the first data stream J clock cycles after PASS_DATA is asserted. Modular correction and multiplicand bits associated with the second data stream are received J+1 cycles after the assertion of the PASS_DATA signal. The leftmost cell of the topmost array receives the corresponding multiplicand bit associated with the first data stream N cycles after the assertion of PASS_DATA. Similarly, the leftmost cell receives the multiplicand bit associated with the second stream N+1 cycles after the assertion of PASS_DATA. The modular correction input associated with the leftmost cell of the topmost array is grounded.

An illustration of the modular multiplier array cascade for the K=4, N=5 case is shown in FIG. 1. Arrays for other parameterizations should be evident to an individual in the field with a grasp of the above description.

What is claimed is:
1. A machine for processing digital data which performs modular multiplication, comprising:
  (a) input lines, transferring a plurality of data comprising:
    (1) modular correction words of size N bits, and
    (2) multiplicand data words of size N+1 bits, and
    (3) multiplier data words of size N+1 bits, and
  (b) output lines which transfer modular product words of size N+1 bits, and
  (c) K rows of processing cells each comprising
    (1) delay elements which transfer an input bit presented during the current clock cycle to the output upon the subsequent clock cycle, and
    (2) multiplexed delay elements which transfer the primary input presented during the current clock cycle to the output during the next clock cycle when the select input is de-asserted, and transfer the secondary input presented during the current clock cycle to the output during the next clock cycle when the select input is asserted, and
    (3) multiplexed dual delay elements which transfer the primary input presented during the current clock cycle to the output during the clock cycle after next when the select input is de-asserted, and transfer the secondary input presented during the current clock cycle to the output during the clock cycle after next when the select input is asserted, and
    (4) N−1 inner cells which:
      (a) compute the binary sum of the multiplicand input bit ANDed with the multiplier input bit, the modular correction input bit ANDed with the modular selection input bit, the partial sum input bit, and the two carry input bits, and
      (b) transfer the least significant bit of the said binary sum to the partial sum output bit, and
      (c) transfer the two most significant bits of the said binary sum to the two carry output bits, and
      (d) transfer the said multiplicand input, said multiplier input, said modular correction input, and said modular selection input bits to the multiplicand output, multiplier output, modular correction output, and modular selection output bits, respectively, and
      (e) are connected such that the said multiplicand output is transferred to the primary input of a said multiplexed dual delay element whose output is connected to the multiplicand input of the below-adjacent cell in the below-adjacent row of processing cells and whose secondary input is connected to the multiplicand output of the above-adjacent cell in the above adjacent row of processing cells, and
      (f) are connected such that the said modular correction output is transferred to the primary input of a said multiplexed dual delay element whose output is connected to the modular correction input of the below-adjacent cell in the below-adjacent row of processing cells and whose secondary input is connected to the modular correction output of the above-adjacent cell in the above adjacent row of processing cells, and
      (g) are connected such that the said modular selection output and said multiplier outputs are each transferred to a said delay element whose output is connected to the said modular selection input and said multiplier input, respectively, of the left-adjacent cell within the same row of processing cells, and
      (h) are connected such that the said two carry outputs are each transferred to a said delay element whose output is connected to the respective carry input of the left-adjacent cell within the same row of processing cells, and
      (i) are connected such that the said partial sum output is transferred to the primary input of a said multiplexed delay element whose output is connected to the said partial sum input of the right-adjacent cell within the same row of processing cells and whose secondary input is connected to the left-adjacent cell in the above-adjacent row of processing cells, and
    (5) a least significant cell which
      (a) computes the binary sum of the multiplicand input bit ANDed with the multiplier input bit, the modular correction input bit ANDed with the modular selection input bit, and the partial sum input bit, and
      (b) transfers the least significant bit of the said binary sum to the partial sum output bit, and
      (c) transfers the two most significant bits of the said binary sum to the two carry output bits, and
      (d) transfer the said multiplicand input, said multiplier input, said modular correction input, and said modular selection input bits to the multiplicand output, multiplier output, modular correction output, and modular selection output bits, respectively, and
      (e) is connected such that the said multiplicand output is transferred to the primary input of a said multiplexed dual delay element whose output is connected to the multiplicand input of the below-adjacent cell in the below-adjacent row of pro- cessing cells and whose secondary input is connected to the multiplicand output of the above-adjacent cell in the above adjacent row of processing cells, and (f) is connected such that the said modular correction output is transferred to the primary input of a said multiplexed dual delay element whose output is connected to the modular correction input of the below-adjacent cell in the below-adjacent row of processing cells and whose secondary input is connected to the modular correction output of the above-adjacent cell in the above adjacent row of processing cells, and (g) is connected such that the said modular selection output and said multiplier outputs are each transferred to a said delay element whose output is connected to the said modular selection input and said multiplier input, respectively, of the left-adjacent cell within the same row of processing cells, and (h) is connected such that the said two carry outputs are each transferred to a said delay element whose output is connected to the respective carry input of the left-adjacent cell within the same row of processing cells, and (i) is connected such that the said multiplier input is externally supplied in a two-signal-interleaved, serial, least-significant-bit-first manner beginning with data sample number $[(N+1)/K]*R$ and ending with sample $[(N+1)/K]*(R+1)-1$, where N represents the word length of the said modulus datum in bits, K represents the number of rows, R represents the row number to which the current cell belongs, and [ARGUMENT] represents the next highest integer closest to ARGUMENT and is identical to ARGUMENT when ARGUMENT is an integer, and (j) is connected such that the said partial sum output is transferred to the primary input of a said multiplexed delay element whose output is connected to the said modular selection input of the current cell within the same row of processing cells and whose secondary input is connected to the partial sum output of the above-adjacent cell in the above-adjacent row of processing cells, and (6) a most significant cell which:

(a) computes the binary sum of the multiplicand input bit ANDed with the multiplier input bit, the modular correction input bit ANDed with the modular selection input bit, and the partial sum input bit, and (b) transfers the least significant bit of the said binary sum to the partial sum output bit, and (c) transfers the single most significant bit of the said binary sum to the carry output bit, and (d) transfers the said multiplicand input to the multiplicand output, and (e) is connected such that the said multiplicand output is transferred to the primary input of a said multiplexed dual delay element whose output is connected to the multiplicand input of the below-adjacent cell in the below-adjacent row of processing cells and whose secondary input is connected to the multiplicand output of the above-adjacent cell in the above adjacent row of processing cells, and (f) is connected such that the said carry output is transferred to the primary input of a said multiplexed delay element whose output is connected to the partial sum input of the current cell and whose secondary input is connected to the carry output of the above-adjacent cell in the above-adjacent row of processing cells, and (g) is connected such that the said partial sum output is transferred to the primary input of a said multiplexed dual delay element whose output is connected to the said partial sum input of the right-adjacent cell within the same row of processing cells and whose secondary input is connected to the left-adjacent cell in the above-adjacent row of processing cells, and (d) a counter which asserts the output PASS_DATA signal for a duration of two clock cycles every $[(N+2)/K]$ clock cycles and otherwise de-asserts the signal, whereby said multiplicand datum and said multiplier datum are multiplied modulo said modulus datum for each of two data sets.

* * * * *